UNITED STATES PATENT OFFICE.

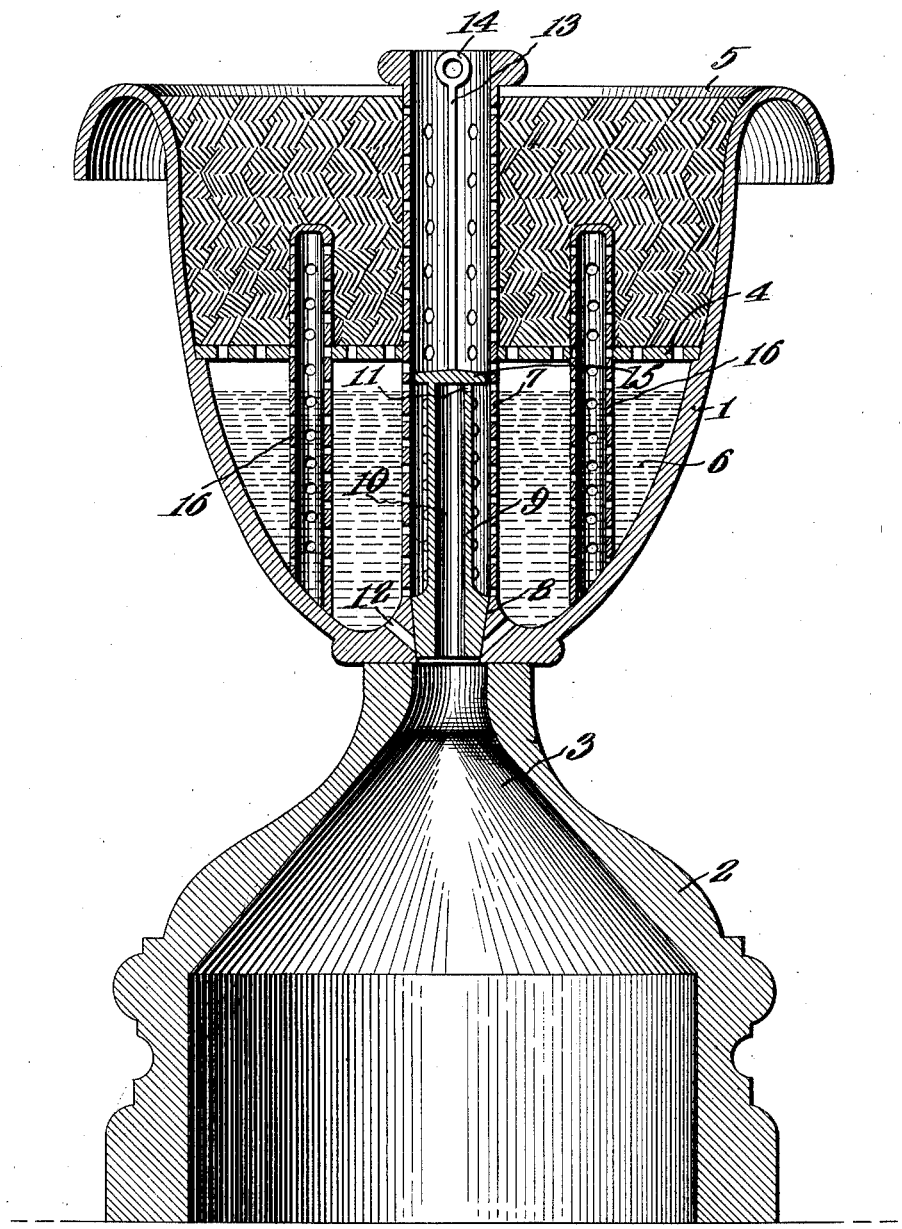

LUCIAN W. CARR, OF CRAWFORDSVILLE, INDIANA.

APPARATUS FOR AERATING AND IRRIGATING SOIL.

1,108,334.  Specification of Letters Patent.  Patented Aug. 25, 1914.

Application filed October 20, 1913. Serial No. 796,311.

*To all whom it may concern:*

Be it known that I, LUCIAN W. CARR, a citizen of the United States, residing at Crawfordsville, in the county of Montgomery and State of Indiana, have invented a new and useful Apparatus for Aerating and Irrigating Soil, of which the following is a specification.

This invention relates to apparatus for the aerating and irrigating of soil.

An object of the present invention is to provide an apparatus, in the present drawings illustrated in connection with a vase, wherein the soil will be maintained in a moist and aerated condition.

A further object is to provide a water and air chamber disposed beneath the layer of soil and separated therefrom by a porous or perforated plate, through which plate extends a number of tubes, either perforated or porous and which tubes extend up within the soil so that the water vapors will pass up through the soil for the aerating and irrigating thereof.

A further object is to provide an apparatus such as may be used to grow flowers upon the tops of monuments and similar inaccessible places and which apparatus will maintain the soil in an aerated and moist condition by providing the apparatus with a quantity of water at the expiration of lengthy intervals of time, such as every two or three months.

A further object is to provide an apparatus in which the soil will be maintained in a moist condition by the evaporation of water from a water reservoir, the vapors from which pass upward through porous plates and penetrate in the soil adjacent the roots of the plant life so as to apply the moisture at the most effective places.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable embodiment of my invention is illustrated, in which the figure represents a vertical sectional view of a vase constructed along the lines of my invention.

Referring to the drawing in which similar reference numerals designate corresponding parts throughout the several views, 1 designates a vase mounted upon a supporting pedestal 2, the latter being provided with an opening 3 extending through the top thereof. The cross sectional contour or configuration of the vase 1 and parts carried thereby is of no consequence and may be varied or modified to as great a degree as consistent with the successful operation of the whole, or amplified as conditions may warrant.

The vase or receptacle 1 is provided with a porous or perforated plate 4 extending horizontally thereacross and dividing the vase into an upper soil receiving receptacle 5 and a lower water containing reservoir 6. A perforated or porous tube 7 extends down through the receptacle 5 and reservoir 6 and is fixedly secured to the bottom of the latter. The tube 7 is open at its upper extremity and in addition to serving as a water inlet also provides for the admission of air to the air chamber which is defined by the upper surface of the liquid within the water reservoir 6 as a bottom and the plate 4 as a top. The tube 7 surrounds a valve opening 8 which opening communicates with and is positioned above the opening 3 of the pedestal 2. A valve 9 is provided with the longitudinal bore 10 extending therethrough and which bore also communicates with the opening 3 of the pedestal at its lower extremity and communicates with the water reservoir 6 through the opening 11 adjacent its upper extremity and which opening defines the level of the liquid within the reservoir.

The lower portion of the valve 9 when in a seated condition as illustrated in the drawings closes the outlet openings 12 which communicate with the lower extremity of the water reservoir 6 and the valve opening 8 so that when the valve 9 is raised the reservoir may be drained, the water passing through the openings or ducts 12 down into the pedestal 2. The valve 9 is provided with the rod 13 projecting up through the tube 7 and provided with the terminal eye 14 so that the valve may be easily raised and lowered. The valve is provided with a guide head 15 which contacts with the side walls of the tube 7 and insures the proper seating of the valve in the valve seat or opening 8.

Positioned in the water reservoir and extending up through suitable openings in the plate 4 are the tubes 16 which are formed of porous material or may be provided with a plurality of perforations extending therethrough. These tubes project well up into the soil containing reservoir 5 and are adapted to conduct the air and vapors from the air and liquid containing receptacle 6 up in the soil to provide for the proper aerating and irrigating thereof.

The overflow opening 11 which controls the height of liquid within the liquid containing reservoir 6 is spaced some distance below the transverse plate 4 so that an air chamber will always be present above the surface of the water and which air chamber is provided with fresh air down through the air and water inlet tube 7 which communicates therewith. Thus the air chamber will be constantly provided with fresh air which insures for a constant evaporation of the water, the supply of air however being such that the vapor density will be maintained near the point of saturation at all times. The saturated vapors pass up through the tubes 16 and properly aerate and irrigate the soil, the gases or vapors making their way through the soil and maintaining the same in a productive condition for plant life. If at any time it is desired to drain the water reservoir, the same may be quickly as well as easily accomplished by manually engaging the eye 14 of the rod 13 and moving the valve upward which allows the water to escape down through the pedestal 2.

The many advantages of the apparatus as herewith disclosed will be appreciated and mention is made of the fact that the size and shape of the vessel 1 does not in any way influence the action of the device as it may be applied with equal facility to hot beds with no definite limitations, in which event the soil receiving receptacle would be omitted and the liquid containing tank positioned in the ground with the porous plate 4 supported thereabove and the earth filled in on the plate, the air and water inlet tube 7 projecting above the top surface thereof.

Having thus fully described my invention, what I claim is:—

1. In an apparatus of the class described, the combination of a liquid containing reservoir, a plate extending thereacross and supported thereby, said plate adapted to support soil thereabove and allowing for the passage of moisture and air therethrough, an air and water inlet tube extending through the said plate and communicating with the reservoir, means positioned within said tube preventing the rise of liquid within the reservoir above a certain height, to thereby insure an air space between the upper level of the liquid and below the said plate, and moisture and air conducting tubes positioned within the said liquid containing reservoir and extending through and above said plate, said tubes allowing for the passage of water and air therethrough for the irrigating and aerating of the soil disposed upon the said plate.

2. In an apparatus of the class described, the combination of a liquid receiving reservoir, a plate extending thereacross and supported thereby, said plate adapted to support soil thereabove and allowing for the passage of moisture and air therethrough, an air and water inlet tube extending through the said plate communicating with the said liquid containing reservoir, a valve disposed within said tube allowing for the draining of said liquid containing reservoir, an overflow for said reservoir preventing the level of the water reaching the height of the said plate to thereby provide an air chamber therebetween, and means extending through the said plate adapted to conduct air and moisture from the air chamber up in the said soil.

3. An apparatus of the class described comprising a liquid receiving reservoir, a plate extending thereacross and supported thereby, an air and water inlet tube extending through said plate and communicating with the said reservoir, a valve controlled means for the draining of said reservoir, said valve provided with an overflow opening for limiting the height of liquid within the reservoir to provide an air chamber between the liquid and the said plate, and aerating and irrigating tubes positioned within the said liquid receiving reservoir extending through and above the said plate adapted to supply air and moisture to the soil supported by the said plate.

4. An apparatus of the character indicated, including a liquid-tight vessel, a perforated plate extending thereacross and dividing the same into upper and lower compartments, a perforated tube projecting through said compartments and through said plate, said lower compartment provided with an outlet opening, a valve member closing said opening and guided in its motion by the walls of said tube, said valve provided with a bore extending centrally therethrough, an overflow opening communicating with the bore of said valve, automatically governing the level of liquid within the said reservoir, said tube providing for the ingress of air and water within the reservoir, supplying vaporous gases to the soil.

In testimony that I claim the foregoing as my own, I have hereunto affixed my signature in the presence of two witnesses.

LUCIAN W. CARR.

Witnesses:
CLYDE H. JONES,
JANE A. MAHONEY.